US006505257B2

(12) United States Patent
Murata et al.

(10) Patent No.: US 6,505,257 B2
(45) Date of Patent: Jan. 7, 2003

(54) MULTI-PROCESSOR SYSTEM, DISK CONTROLLER USING THE SAME AND NONDISRUPTIVE MAINTENANCE METHOD THEREOF

(75) Inventors: Tomohiro Murata, Yokohama (JP); Mitsuaki Niida, Chigasaki (JP); Kenzo Kurihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/785,318

(22) Filed: Feb. 20, 2001

(65) Prior Publication Data

US 2001/0007148 A1 Jul. 5, 2001

Related U.S. Application Data

(63) Continuation of application No. 09/014,879, filed on Jan. 28, 1998, which is a continuation of application No. 08/436,859, filed on May 8, 1995, now Pat. No. 5,729,761.

(30) Foreign Application Priority Data

May 13, 1994 (JP) ............................................ 06-099705

(51) Int. Cl.$^7$ .............................................. G06F 13/14
(52) U.S. Cl. ............................... 710/8; 710/38; 710/14; 714/38
(58) Field of Search ............................. 710/8, 14, 38, 710/31; 714/38

(56) References Cited

U.S. PATENT DOCUMENTS

| | | | |
|---|---|---|---|
| 4,527,237 A | | 7/1985 | Frieder et al. |
| 4,788,637 A | * | 11/1988 | Tamaru ...................... 709/221 |
| 5,155,837 A | * | 10/1992 | Liu et al. |
| 5,212,789 A | | 5/1993 | Rago .............................. 707/8 |
| 5,367,669 A | * | 11/1994 | Holland et al. ................. 714/7 |
| 5,410,703 A | * | 4/1995 | Nilsson et al. ............... 395/712 |
| 5,421,017 A | | 5/1995 | Schoiz et al. ............... 395/712 |
| 5,459,856 A | * | 10/1995 | Inoue ........................... 711/113 |
| 5,699,504 A | * | 12/1997 | Mano .................... 395/182.08 |
| 5,729,761 A | | 3/1998 | Murata et al. ................. 710/14 |

FOREIGN PATENT DOCUMENTS

| | | |
|---|---|---|
| AU | 71272 | 8/1991 |
| AU | 26336 | 4/1992 |
| EP | 0204449 | 12/1986 |
| EP | 0305068 | 3/1989 |
| EP | 0318270 | 5/1989 |
| EP | 0320274 | 6/1989 |
| EP | 0398694 | 11/1990 |
| EP | 0533196 | 3/1993 |
| GB | 2231180 | 11/1990 |

* cited by examiner

*Primary Examiner*—Jeffrey Gaffin
*Assistant Examiner*—Abdelmoniem Elamin
(74) *Attorney, Agent, or Firm*—Antonelli, Terry, Stout, & Kraus, LLP.

(57) ABSTRACT

A plurality of processors of a disk controller are divided into a plurality of clusters. In normal operation, data is transferred between a host computer and a disk drive in a cluster non-restricted processing mode in which a job can be distributedly processed among processors belonging to any clusters without regard to cluster. In response to a program version upgrading command from an operator, the cluster mode is shifted from the cluster non-restricted processing mode to a cluster restricted processing mode in which the cluster to which processors which are permitted to distributedly process one job belong is restricted. When the shifting to the cluster restricted processing mode is completed, one cluster is selected as a cluster to be maintained and versions of the programs to be executed by the processors belonging to the cluster to be maintained are upgraded. When the versions of the programs of all processors of the cluster to be maintained have been upgraded, the acceptance of a new job by the processors belonging to the cluster to be maintained is resumed and the execution of the new programs is started. The selection of the cluster, the version upgrading of the programs and the start of the execution of the new programs are repeated sequentially for all clusters. When the version upgrading of the programs of all processors is completed, the cluster mode is returned from the cluster restricted processing mode to the cluster non-restricted process mode.

10 Claims, 9 Drawing Sheets

| PROCESSOR NUMBER | ALLOCATED CLUSTER NUMBER | PROCESSOR ATTRIBUTE |
|---|---|---|
| 211 | 1 | CHANNEL CONTROL CPU |
| 212 | 1 | CHANNEL CONTROL CPU |
| 213 | 1 | DRIVE CONTROL CPU |
| 214 | 1 | DRIVE CONTROL CPU |
| 221 | 2 | CHANNEL CONTROL CPU |
| 222 | 2 | CHANNEL CONTROL CPU |
| 223 | 2 | DRIVE CONTROL CPU |
| 224 | 2 | DRIVE CONTROL CPU |

| EXECUTION CLUSTER INDICATION | 1... CLUSTER NON-RESTRICTED MODE<br>2... CLUSTER RESTRICTED MODE |
|---|---|

| ACCESS COMMAND REQUEST | COMMAND TYPE | | | | | | | | 811 |
|---|---|---|---|---|---|---|---|---|---|
| | DRIVE NUMBER | DRIVE D0 | | | | | | | 812 |
| | CYLINDER NUMBER | | | | | | | | 813 |
| | TRACK NUMBER | | | | | | | | 814 |
| | RECORD NUMBER | | | | | | | | 815 |
| EXECUTABLE PROCESSOR DESIGNATION BIT MAP | PROCESSOR NUMBER | 211 | 212 | 213 | 214 | 221 | 222 | 223 | 224 |
| | EXECUTABLE 1··POSSIBLE 0··IMPOSSIBLE | | | | | | | | |
| I/O REQUEST EXECUTION STATE | 0...NO EXECUTION REQUEST  1...WAITING FOR EXECUTION OF DRIVE CONTROL CPU  2...WAITING FOR EXECUTION OF CHANNEL CONTROL CPU  3...EXECUTING | | | | | | | | |

| CLUSTER NUMBER | OPERATION MODE |
|---|---|
| 1 | 1... NORMAL OPERATION MODE  2... SUSPENDED MODE  3... MAINTENANCE OPERATION MODE |
| 2 | |

710    720

700

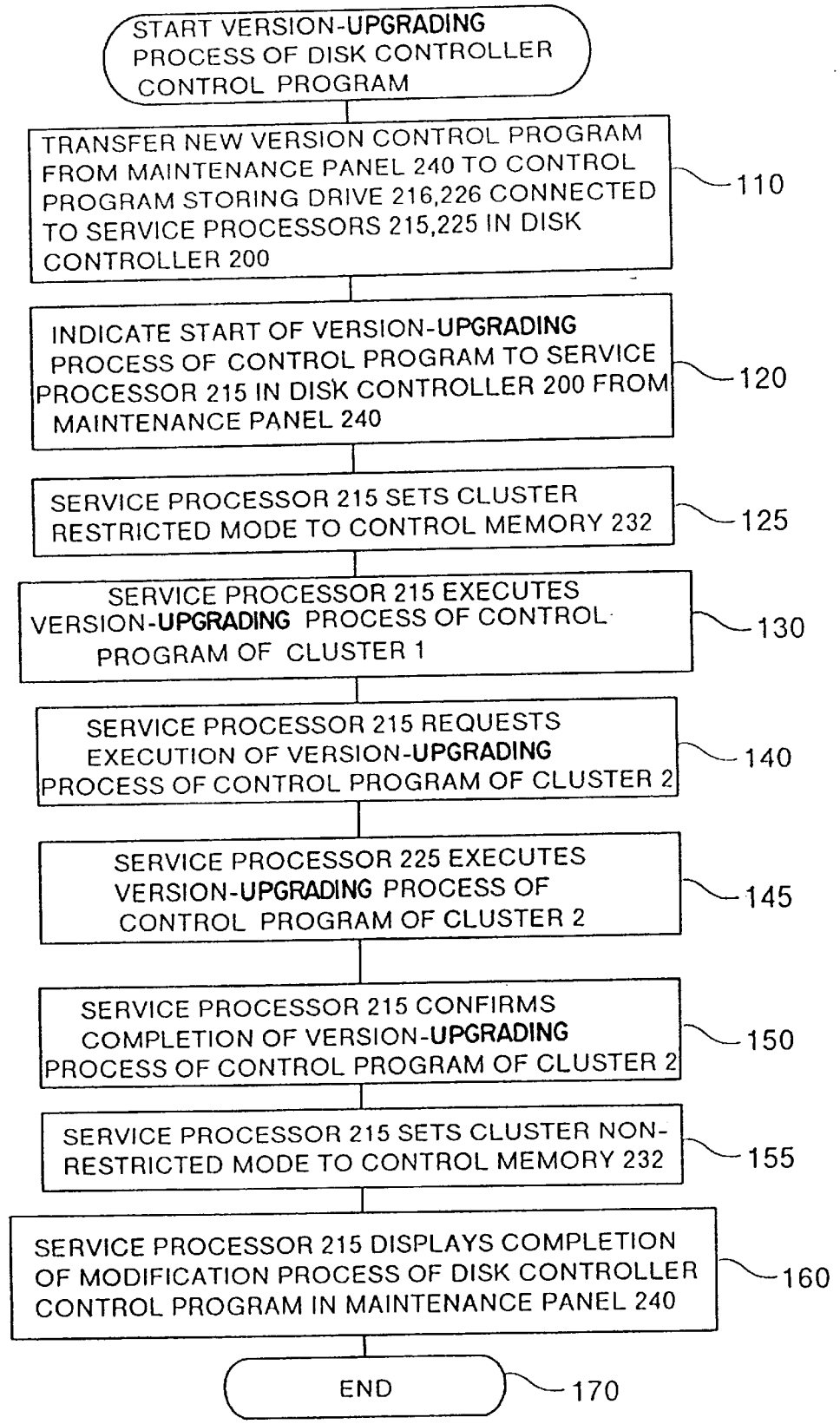

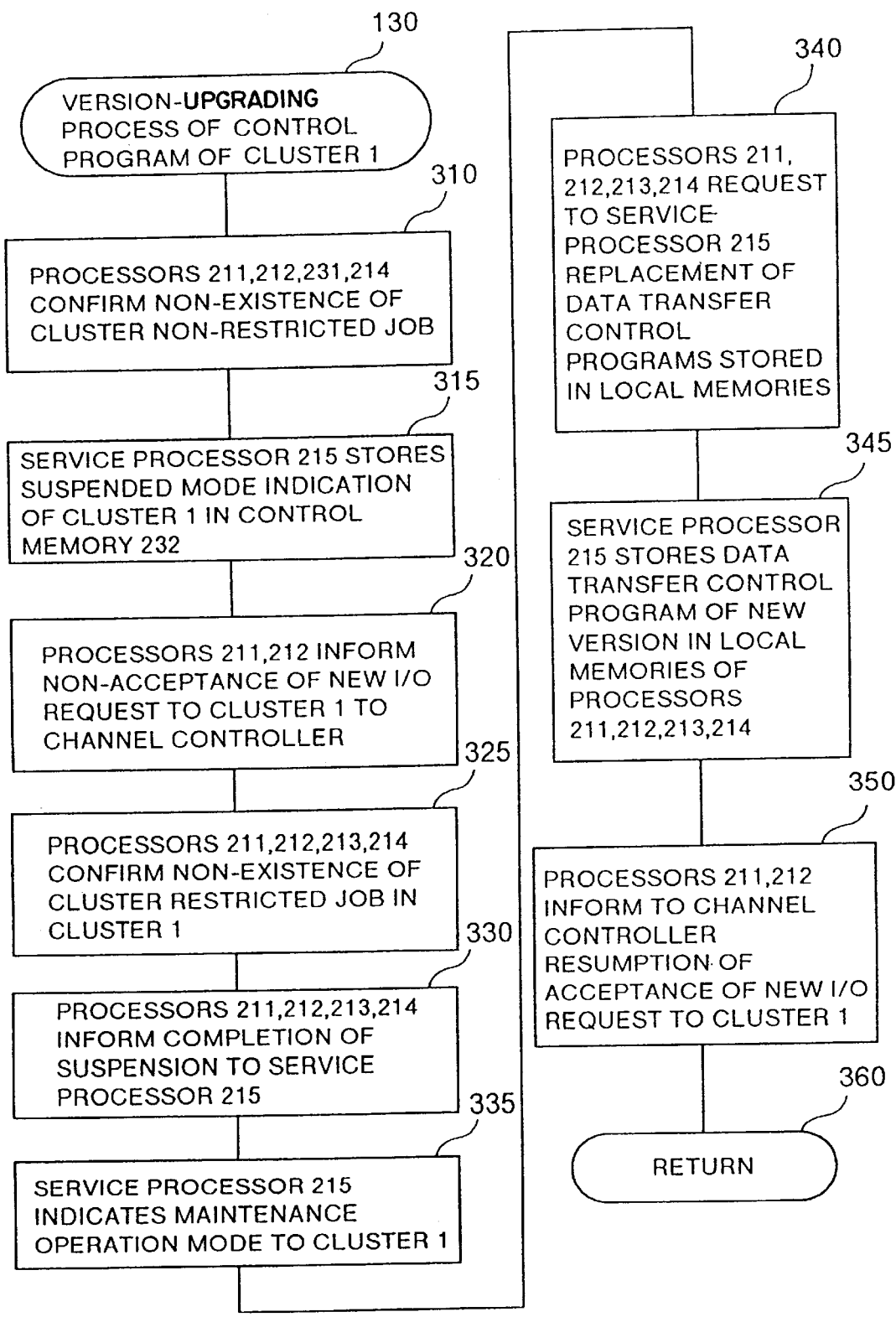

FIG.10

| | CLUSTER A | CLUSTER B | CLUSTER C | CLUSTER D |
|---|---|---|---|---|
| CLUSTER A | | OK | OK | OK |
| CLUSTER B | OK | | OK | OK |
| CLUSTER C | OK | OK | | OK |
| CLUSTER D | OK | OK | OK | |

100 DISTRIBUTEDLY PROCESSABLE CLUSTER COMBINATION INFORMATION

| | CLUSTER A | CLUSTER B | CLUSTER C | CLUSTER D |
|---|---|---|---|---|
| CLUSTER A | | NG | NG | NG |
| CLUSTER B | NG | | OK | OK |
| CLUSTER C | NG | OK | | OK |
| CLUSTER D | NG | OK | OK | |

MULTI-PROCESSOR SYSTEM, DISK CONTROLLER USING THE SAME AND NONDISRUPTIVE MAINTENANCE METHOD THEREOF

This is a continuation of application Ser. No. 09/014,879, filed Jan. 28, 1998; which is a continuation of Ser. No. 08/436,859, filed May 8, 1995, now U.S. Pat. No. 5,729,761.

BACKGROUND OF THE INVENTION

The present invention relates to a multi-processor system and a program version method therefor. More particularly, it relates to a disk controller comprising a multi-processor system including a plurality of processors and a control program upgrading method therefor.

In the multi-processor system, processing of a job may be efficiently conducted by dividing the job among a plurality of processors for processing. As one form of application of the multi-processor system, a disk controller of a multi-processor configuration has been put into practice. Such a disk controller is disclosed in JP-A-2-62623. In the disk controller disclosed in JP-A-2-62623, a job such as reading or writing of data is distributedly executed by a processor which controls data transfer between a disk controller and a host computer, and a processor which controls data transfer between the disk controller and a disk drive. Specifically, for example, data read from one disk drive by one processor is transferred to the host computer by another processor. Thus, the data transfer process between the host computer and the disk controller and the data transfer process between the disk drive and the disk controller may be executed in parallel and efficient data transfer may be attained.

In the disk controller of the multi-processor configuration described above, it is possible to stop the processing by some processors and continue the data transfer control by the other processors to maintain fault processors. However, in such a maintenance method, it is a premise that the processors which distributedly process a job execute the same version of a program. When versions of the program to be executed by the respective processors are to be upgraded and the maintenance is conducted in this manner, there occurs a period in which the programs of different versions co-exist and one job may be shared by the processors which execute the different versions of the program. In such a case, there may be no assurance of consistent processing of the job. As a result, when the versions of the program executed by the processors are to be upgraded, the system has to be wholly stopped.

SUMMARY OF THE INVENTION

It is an object of the present invention to solve the problem encountered in the prior art system and enable the maintenance processing such as upgrading versions of the program while continuing the processing by the system.

In order to achieve the above object, in the multi-processor system of the present invention, each processor belongs to one of a plurality of logical clusters. The system includes a cluster non-restricted mode in which the distributed processing of one job among processors belonging to any clusters is permitted, and a cluster restricted mode in which the distributed processing of one job among processors belonging to different clusters is restricted.

In a maintenance method of the present invention, in the multi-processor system described above, the cluster mode is shifted from the cluster non-restricted mode to the cluster restricted mode and a cluster is selected from the plurality of clusters. The acceptance of a new job in the selected cluster is inhibited and the maintenance processing such as the upgrading of the versions of the program in all of the processors in the selected cluster is conducted and the acceptance and processing of a new job among processors in the selected clusters is permitted again. The selection of the cluster and the maintenance processing are effected sequentially for each of the clusters, and after the maintenance processing has been completed for the processors of all clusters, the cluster mode is returned to the cluster non-restricted mode. During the maintenance of the processors in the selected cluster, the processors in the non-selected clusters are restricted to execute the processing of the job in the cluster restricted mode. In this manner, even if the processing of the job is continued by the processors which are not to be maintained during the maintenance of the system such as the upgrading of the versions of the program, the distributed processing of the job by the different versions of the program may be prevented and the maintenance process may be conducted without stopping the whole system.

BRIEF DESCRIPTION OF THE DRAWINGS

FIG. 2 shows a format of cluster allocation information stored in a control memory, FIG. 3 shows a format of execution cluster indication information stored in the control memory, FIG. 4 shows a format of I/O job execution control information stored in the control memory, FIG. 5 shows a format of cluster operation mode indication information stored in the control memory, FIG. 6 shows a main flow chart of a version upgrading process for a disk control program, FIG. 7 shows a detailed flow chart of the program version upgrading process for a cluster A, FIG. 10 shows a format of distributedly processable cluster combination information, FIG. 11 shows another format of the distributedly processable cluster combination information.

DESCRIPTION OF THE PREFERRED EMBODIMENTS

Figure 1:
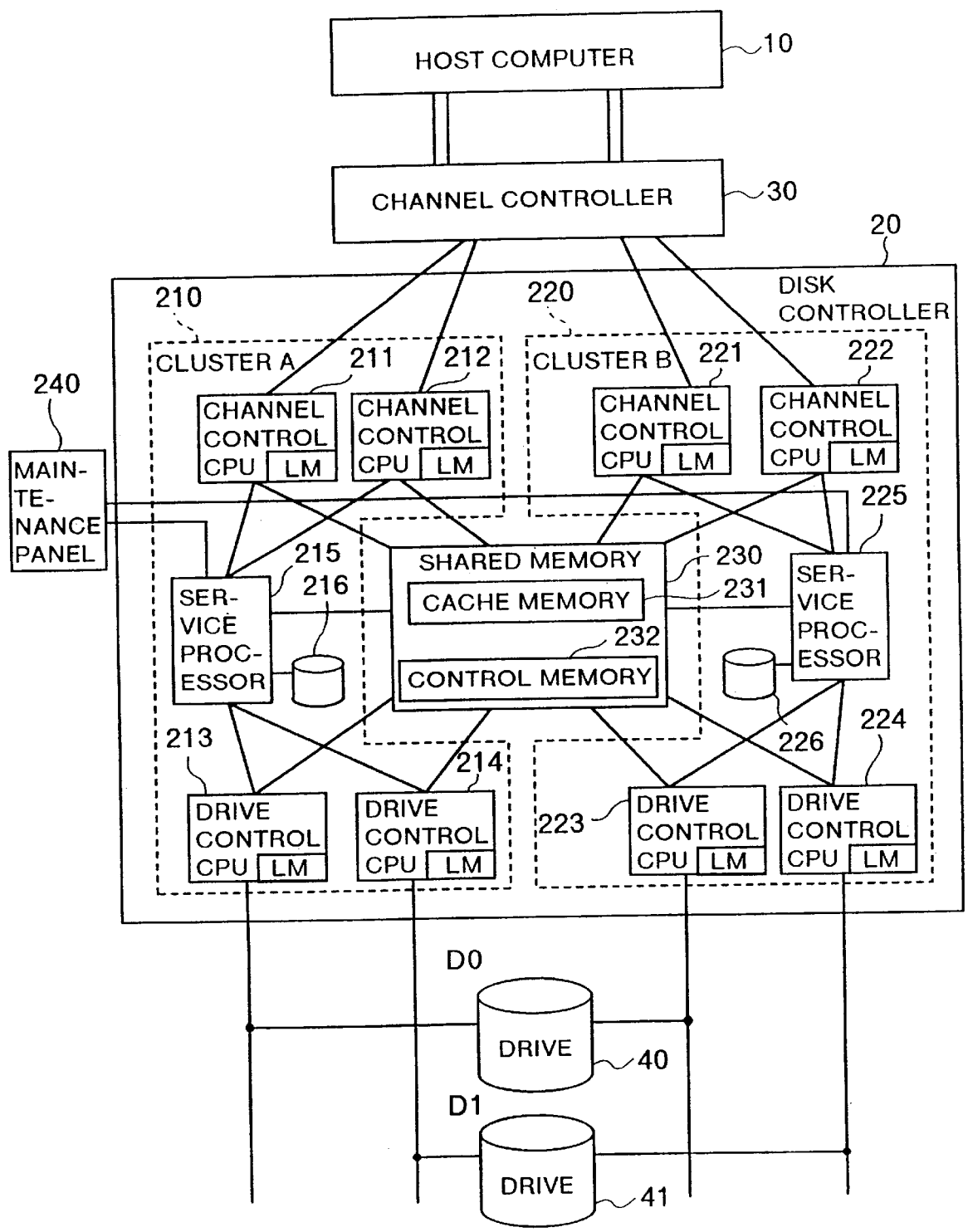
FIG. 1 shows a configuration of a disk controller in accordance with the present invention.

FIG. 1 shows a configuration of a disk controller in accordance with a first embodiment of the present invention. A disk controller 200 comprises a plurality of processors 211, 212, 213, 214, 221, 222, 223 and 224, each having a local memory LM, service processors 215 and 225 having disk drives 216 and 226, respectively, each storing a control program, and a shared memory 230 having a cache memory 231 and a control memory 232 and being commonly accessible by the processors 211–214 and 221–224 and the service processors 215 and 216. Of the processors belonging to the disk controller 200, the processors 211, 212, 221 and 222 are connected to a host computer 10 through a channel controller 30. The processors 213, 214, 223 and 224 are connected to disk drives 40 and 41. Hereinafter, in order to discriminate those processors, the former are referred to as channel control processors and the latter are referred to as drive control processors. The local memory of each of the processors 211–214 and 221–224 stores a data transfer program for controlling the data transfer between the disk drives 40 and 41 and the channel controller 30 and a maintenance support program for supporting the system maintenance. The service processors 215 and 225 are connected to a maintenance panel 240 which is provided as an interface to an operator.

In the present embodiment, the processors 211–214 and 221–224 are provided in a multi-processor configuration. Those processors are divided into cluster A 210 which comprises the processors 211–214 and cluster B 220 which comprises the processors 221–224. The service processor 215 belongs to the cluster A 210 and the service processor 225 belongs to the cluster B 220.

FIG. 2 shows a logical format of cluster allocation information stored in the control memory 232. The cluster allocation information 500 has three areas: a processor number area 510, an allocated cluster number area 520 and a processor attribute area 530. The processor number area stores the processor numbers allocated to the processors 211–214 and 221–224. FIG. 2 shows that, in the present embodiment, 211, 212, 213, 214, 221, 222, 223 and 224 are allocated to the processors as the processor numbers. (In the present embodiment, the processor numbers allocated to the processors correspond to the reference numerals in FIG. 1 for the sake of convenience.) The allocated cluster number area 520 stores the cluster number of the cluster to which each cluster belongs. FIG. 2 shows that the processors 211, 212, 213 and 214 belong to the cluster of the cluster number '1' (the cluster A 210 in FIG. 1) and the processors 221, 222, 223 and 224 belong to the cluster of the cluster number '2' (the cluster B 220 in FIG. 1). The processor attribute area 530 stores information indicating the attributes of the processors, that is, information indicating which one of the channel control processor (channel control CPU) and the drive control processor (drive control CPU) each processor belongs to. FIG. 2 shows that the processors 211, 212, 221 and 222 are channel control processors and the processors 213, 214, 223 and 224 are drive control processors.

FIG. 3 shows a format of execution cluster indication information stored in the control memory 232. The execution cluster indication information 600 comprises an execution cluster indication area 610 which stores information indicating a cluster mode when the data is transferred. In the present embodiment, the cluster mode includes a cluster non-restricted mode in which any one of the clusters 210 and 220 may be used for the data transfer and a cluster restricted mode in which only one of the clusters may be used. When the data transfer is to be conducted in the cluster non-restricted mode, '1' is stored in the execution cluster indication area 610, and when the data transfer is to be conducted in the cluster restricted mode, '2' is stored.

FIG. 4 shows a format of I/O job execution control information stored in the control memory 232. The I/O job execution control information 800 is provided for each of the disk drives 40 and 41 connected to the disk controller 200. The I/O job execution control information 800 comprises access command request information relating to an access command issued from the host computer 10, executable processor designation information for indicating a processor which may execute the access command issued to the corresponding disk drive and I/O request execution state information for indicating an execution state of the access command to the corresponding disk drive. The access command request information comprises a command type area 811, a drive number area 812, a cylinder number area 813, a track number area 814 and a record number area 815. The command type area 811 stores a command type of the access command issued to the disk drive corresponding to the I/O job execution control information. The access command may include a read command for reading data from the disk drive and a write command for writing data to the disk drive. The drive number area 812 stores the drive number of the disk drive to be accessed in accordance with the I/O job execution control information. The cylinder area 813, the track number area 814 and the record number area 815 store respectively the cylinder number, the track number and the record number indicating the area to be accessed in the disk drive. The executable processor designation information comprises executable processor designation bit map 821. The executable processor designation bit map 821 has bits for the processors 211–214 and 221–224. The bit corresponding to the processor which can execute the access command registered in the access command request information is set to '1' (set), and the bit corresponding to the processor which cannot execute the access command is set to '0' (reset). The I/O request execution state information has an I/O request execution state area 831 which stores information indicating the execution state of the access command. The I/O request execution state area 831 stores the information indicating the execution state of the access command, that is, '0' when there is no execution request for the access command, '1' when waiting for the process by the drive control processor, '2' when waiting for the process by the channel control processor, and '3' when any process is being executed.

FIG. 5 shows a format of cluster operation mode indication information stored in the control memory 232. The cluster operation mode indication information 700 comprises a cluster number area 710 and an operation mode area 720. The cluster number area 710 stores the cluster number of the cluster. The operation mode area stores the information indicating in which operation mode the corresponding cluster is operating. In the present embodiment, the operation mode may include a normal operation mode for conducting a normal operation, a suspended mode in which the access command is not accepted and a maintenance operation mode when a processor belonging to the cluster 210 and a processor belonging to the cluster 220 are executing data transfer programs of different versions. In the normal operation mode, '1' is stored in the operation mode area 720, in the suspended mode, '2' is stored, and in the maintenance operation mode, '3' is stored. The cluster operation mode indication information 700 is referred by the processors at a predetermined timing, for example, in synchronism with the search of the executable job.

In the present embodiment, the data transfer control process (the data read process herein) conducted by the processors of the disk controller 200 is executed as follows.

When the host computer 10 accesses the data stored in the disk drives 40 and 41, it delivers an access command indicating the access to the channel controller 30. The channel controller 30 delivers the access command received from the host computer 10 to one of the channel control processors 211, 212, 221 and 222 of the disk controller 200. It is now assumed that the access command is the read request to the disk drive 40 and the access command is delivered to the channel control processor 211 of the cluster 210.

When the channel control processor 211 receives the access command from the channel controller 30, it refers the I/O request execution state area 831 of the I/O job execution control information corresponding to the disk drive 40, and if it is '0' (no execution request), it updates the information in the I/O request execution state area 831 to '3' (executing). Then, the channel control processor 211 stores the information designated by the access command to the areas 811–815 of the access command request information. When the information stored in the I/O request execution state area 831 is other than '0', the channel control processor 211 returns a busy response to the channel controller 30. The channel control processor 211 refers the execution cluster indication information 600 to check the information stored in the execution cluster indication area 610. When the information stored in the execution cluster indication area 610 is '1' (cluster non-restricted mode), the field (executability indication field) corresponding to the drive control processors 213, 214, 223 and 224, of the executable processor designation bit map area 821 of the I/O job execution control information 800 is set to '1', that is, a bit indicating the executability thereof. On the other hand, when the execution cluster indication area 610 stores '2' (cluster restricted mode), the executability indication fields corresponding to the drive control processors belonging to the same cluster as that to which its own processor belongs, that is, the drive control processors 213 and 214 of the cluster A 210, of the executable processor designation bit map area 821 are set to '1'. Then, the channel control processor 211 sets '1' indicating the waiting for the execution by the drive control processor in the I/O request execution state area 831.

Any one of the drive control processors (the drive control processor 214) refers the I/O request execution state area 831 of the I/O job execution control information to check whether '1' indicating the waiting for the drive control processor has been set or not. If the I/O request execution state area 831 is set to '1', it further checks whether the executability indication field corresponding to its own processor of the executable processor designation bit map area of the I/O execution control information 800 is set to '1' indicating the thereof. If the corresponding executability indication field is set to '1', the I/O request execution area 831 is set to '3' and the data is read from the target disk drive in accordance with the information stored in the areas (the command type 811, the drive number 812, the cylinder number 813, the track number 814 and the record number 815) of the access command request information and it is stored in the cache memory 232 provided in the shared memory 230. Then, the I/O request execution state area of the I/O job execution control information 800 is set to '2' indicating the waiting for the channel control processor. The execution cluster indication information 600 is referred to and if the execution cluster indication area 610 is set to '1' (cluster non-restricted mode), the executability indication fields corresponding to the channel control processors 211, 212, 221 and 222, of the executable processor designation bit map area 821 are set to '1'. On the other hand, if the information stored in the execution cluster indication area 610 is '2' indicating the cluster restricted mode, the drive control processor 223 sets '1' only in the executability indication fields corresponding to the channel control processors 211 and 212 belonging to the same cluster as that to which its own processor belongs, that is, the cluster A 210.

Then, any one of the channel control processors (the channel control processor 212) refers the I/O request execution state area 831 of the I/O job execution control information 800 and checks if it is set to '2' (waiting for the channel control processor) or not. If the I/O request execution state area 831 is set to '2', it further refers the executable processor designation bit map area 821 to check whether the executability indication field corresponding to its own processor is set to '1' or not. If the corresponding bit of the executability indication field is set, the channel control processor 212 sets the I/O request execution state area 831 to '3' and transfers the corresponding data stored in the cache memory 232 to the channel controller 30. Then, it sets the I/O request execution state area 831 to '0' indicating no execution request.

In the data read process by the disk controller of the present embodiment, the process is conducted in the same manner as the data read process in the disk controller of a conventional multi-processor configuration except that each processor refers the execution cluster indication information 600 and the cluster operation mode indication information 700, and refers the executable processor designation information (the executable processor designation bit map 821) and continues the processing while updating. Accordingly, the explanation thereof is omitted.

FIG. 6 shows a flow chart of a maintenance process (program version-up process) of the disk controller 200 of the present embodiment.

In the maintenance process, an operator first stores a new version data transfer control program in the control program storing disk drives 216 and 226 of the service processors 215 and 216 through the maintenance panel 240 (step 110). The operator then commands the start of the control program version upgrading process to the service processor 215 through the maintenance panel 240 (step 120).

When the service processor 215 receives the command to start the control program version upgrading process, it sets '2' indicating the cluster restricted mode to the execution cluster indication information 600 stored in the control memory 232 (step 125). Then, when the channel control processors 211, 212, 213 and 214 receive a new access command from the channel controller 30, they set only the bits corresponding to the processors of the cluster to which its own processor belongs, in the executable processor designation bit map area 821 of the I/O job execution control information 800. Thus, the cluster non-restricted job soon disappears. Thereafter, the service processor 215 executes the version upgrading process for the control programs stored in the local memories of the processors 211, 212, 213 and 214 belonging to the cluster A 210 (step 130). While the version upgrading process for the data transfer control programs of the processors of the cluster A 210 is executed, the processors 221, 222, 223 and 224 of the cluster B 220 execute the data transfer control process in the cluster restricted mode by the data transfer control programs of old version.

When the version upgrading process for the data transfer control programs of the processors of the cluster A 210 is completed, the service processor 215 requests execution of the program version upgrading process for the processors belonging to the cluster B 220 to the service processor 225 (step 140). When the service processor receives the request, it executes the version upgrading process of the data transfer control programs stored in the local memories of the processors 221, 222, 223 and 224 of the cluster B 220 (step 145). When the version upgrading process is completed, the processors 211, 212, 213 and 214 belonging to the cluster A 210 starts the execution of the new version programs and execute the data transfer control process in the cluster restricted mode while the version upgrading process of the programs of the processors of the cluster B 220 is executed.

When the service-processor 215 confirms the completion of the version upgrading process of the data transfer control program of the cluster B 220 (step 150), it sets the operation mode area 720 of the cluster operation mode indication information 700 to '1' indicating the normal operation mode and sets the execution cluster indication information 600 to '1' indicating the cluster non-restricted mode (step 155). The maintenance panel 240 displays a message indicating the completion of the version upgrading process of the data transfer control programs (step 160).

FIG. 7 shows a flow chart of the version upgrading process of the data transfer control program for the cluster A 210 conducted in step 130.

The processors 211, 212, 213 and 214 belonging to the cluster A 210 refer the executable processor designation bit map area 821 of the I/O job execution control information 800 of all disk drives to confirm that there is no cluster non-restricted job (step 310). Specifically, they confirm whether the bit indicating the executability to the processors of both clusters 210 and 220 is set in the executable processor designation bit map area of the I/O job execution control information 800 of each disk drive. The confirmation is effected while each processor recognizes that the cluster restricted mode is indicated by the execution cluster indication information 600 at the completion of execution of the job.

The service processor 215 sets '2' indicating the suspended mode in the operation mode area 720 corresponding to the cluster A 210 of the cluster operation mode indication information 700 (step 315). When the channel control processors 211 and 212 of the cluster A 210 confirm that the operation mode is set in the suspended mode, they inform the channel controller 30 of the non-acceptance of a new access command (step 320). In the process of step 320, the job to be processed by the processors of the cluster A 210 is no longer registered.

The processors 211, 212, 213 and 214 of the cluster A 210 refer the executable processor designation bit map area 821 of the I/O job execution control information 800 to confirm that the bit corresponding to the processors of the cluster A 210 is not set to '1' indicating the thereof (step 325). When the processors 211, 212, 213 and 214 confirm that the bit corresponding to the processors of the cluster A of the executable processor designation bit map area 821 is not set, they inform the service processor 216 of the completion of the shift of its own processor to the suspended state (step 330).

When the service processor 215 receives the notice of completion of the shift of all processors of the cluster A to the suspended state in step 330, it sets '3' indicating the maintenance operation mode in the operation mode area 720 corresponding to the cluster A of the cluster operation mode designation information 700 (step 335). When the processors 211, 212, 213 and 214 confirm that the operation mode has been set to the maintenance operation mode, they request the transfer of the data transfer program of a new version to the service processor 215 (step 340). In response to the request, the service processor 215 transfers the data transfer control program of the new version stored in the disk drive 216 in step 110 (FIG. 6) to the processors 211, 212, 213 and 214 (step 345). The processors 211, 212, 213 and 214 store the received data transfer programs in the local memories of their own processors.

When the data transfer control programs of the new version have been stored in the processors of the cluster A, the service processor 215 sets the information indicating the completion of the storage of the program in the control memory 232 and so informs the processors. In response to the notice, the processors start the execution of the new programs. When the channel control processors 211 and 212 confirm the storage of the new data transfer control programs in the local memories of the processors, they inform the channel controller 30 of the resumption of the acceptance of the access command (step 350).

Figure 8:
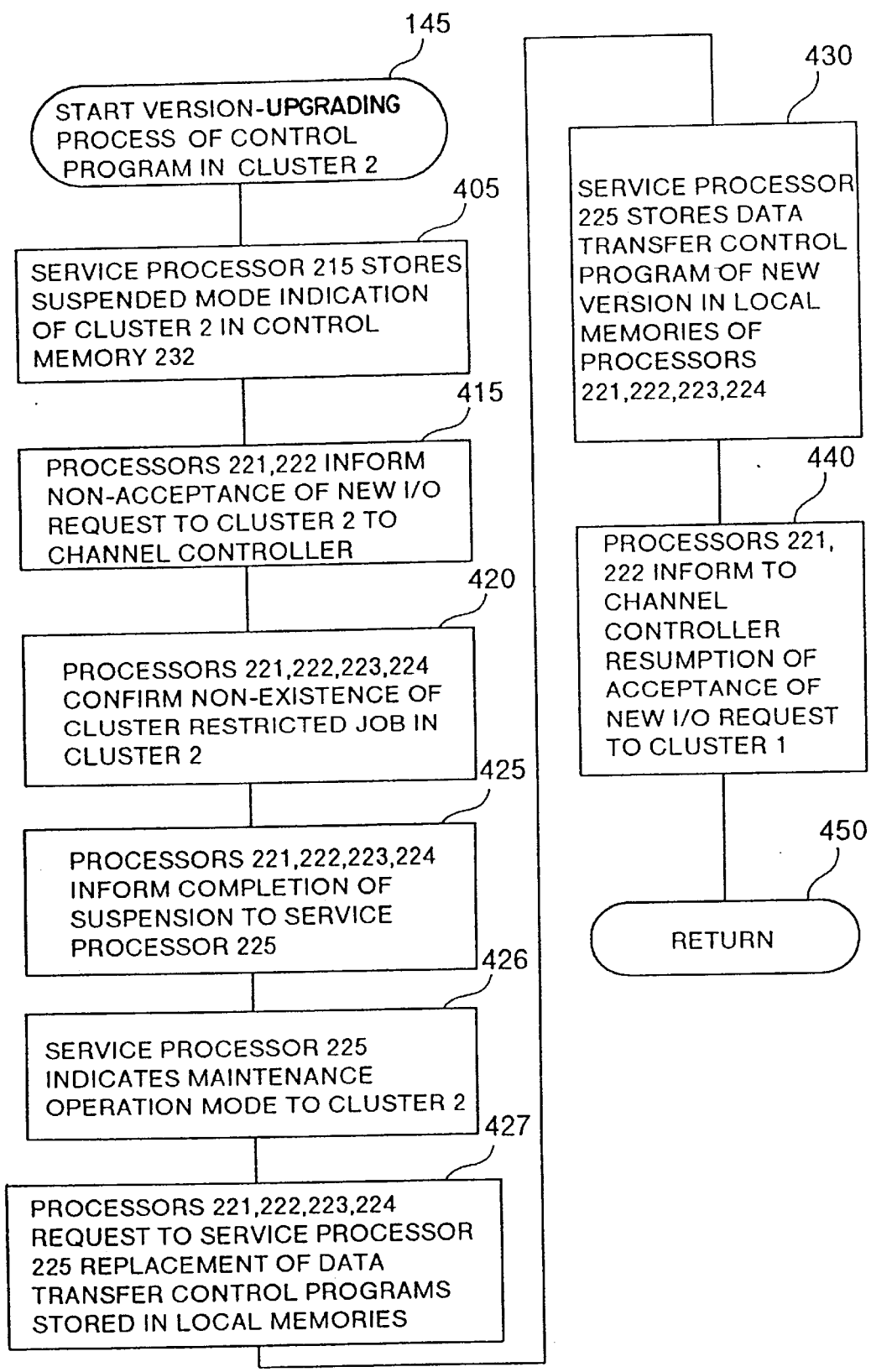
FIG. 8 shows a detailed flow chart of the program version upgrading process for a cluster B.

FIG. 8 shows a flow chart of the version upgrading process of the data transfer control program for the cluster B 220 in step 145 of FIG. 6.

The service processor 225 sets '2' (suspended mode) in the operation mode area 720 corresponding to the cluster B of the cluster operation mode indication information 700 (step 405). Since the non-existence of the cluster non-restricted job has been confirmed in the step 310 of the version upgrading process of the data transfer control program for the cluster A, the confirmation is not necessary here.

The channel control processors 221 and 222 belonging to the cluster B 220 reference the cluster operation mode indication information 700, and when they confirm that the operation mode is set to the suspended mode, they inform the channel controller 30 of the non-acceptance of a new access command (step 415). Then, the processors 221, 222, 223 and 224 of the cluster B reference the executable processor designation bit map area 821 of the I/O job execution control information 800 to confirm that the bit corresponding to the processors of the cluster B is not set (step 420). When the processors 221, 222, 223 and 224 confirm that the bit corresponding to the processors of the cluster B of the executable processor designation bit map area 821 is not set, they inform the service processor 225 of the completion of the shift of their own processors to the suspended state.

When the service processor 225 receives the notice of completion of the shift of all processors of the cluster B to the suspended state, it sets the operation mode area 720 corresponding to the cluster B of the cluster operation mode indication information 700 to '3' (maintenance operation mode) (step 426). When the processors 221, 222, 22 and 224 of the cluster B confirm that the operation modes have been set to the maintenance operation mode, they request the transfer of the data transfer control programs to the service processor 225 (step 427). In response to the request, the service processor 225 transfers the data transfer control program stored in the disk controller 226 to the processors of the cluster B (step 430). The processors 221, 222, 223 and 224 store the transferred data transfer program in the local memories of their own processors.

When the processors of the cluster B confirm that the new data transfer control program has been stored in the local memories of all of the processors of cluster B, they start the execution of the new data transfer control program. The channel control processors 221 and 222 inform the resumption of the acceptance of the access command to the channel controller 30 (step 440).

By the maintenance process described above, the data transfer program executed by the respective processors may be upgraded without interfering with the processors executing the data transfer control programs of different versions. Thus, the maintenance process can be conducted without wholly stopping the disk controller.

Figure 9:
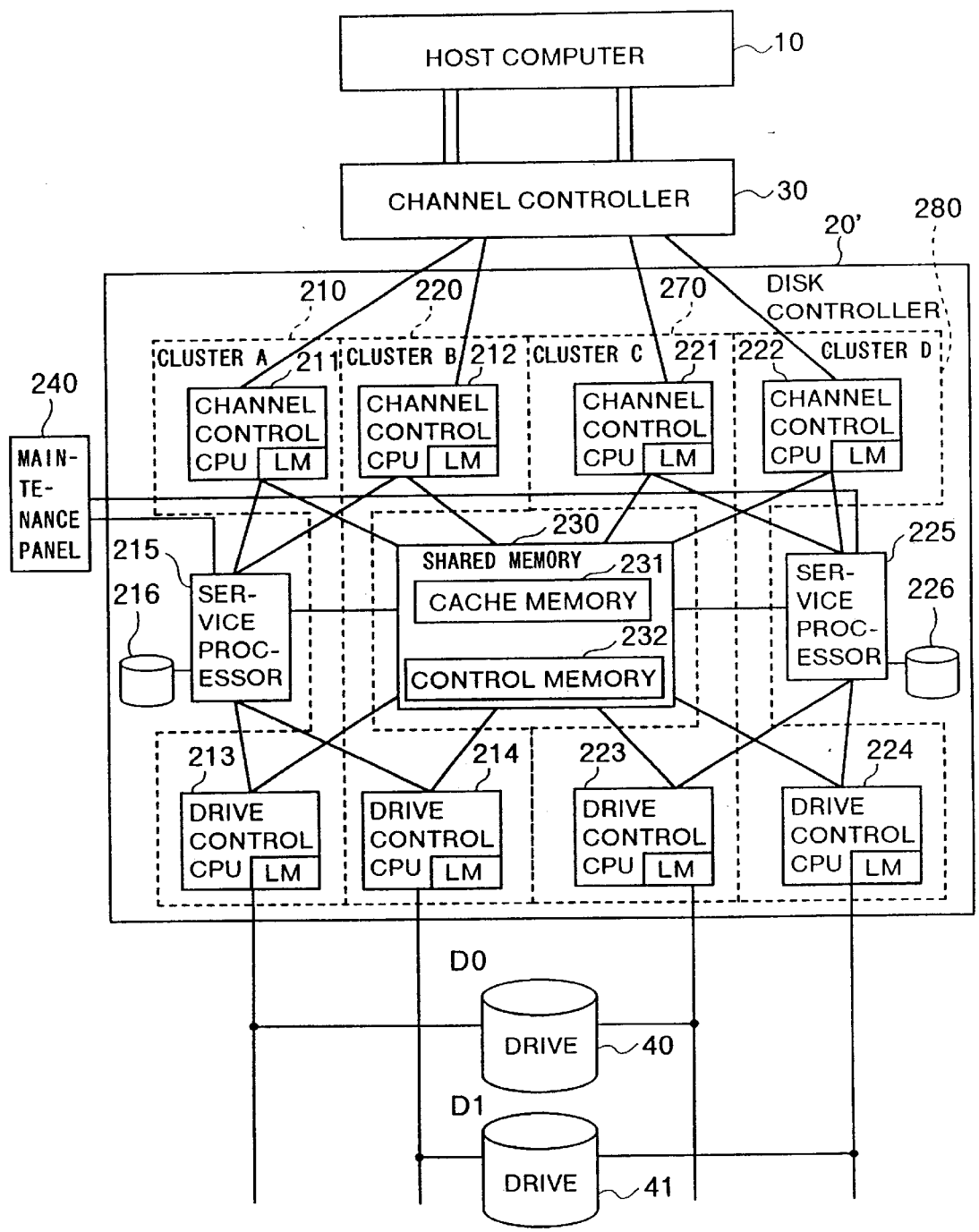
FIG. 9 shows a configuration of a disk controller in accordance with another embodiment of the present invention.

FIG. 9 shows a configuration of the disk controller in accordance with a second embodiment of the present invention. The present embodiment has a similar configuration to that of the embodiment described above except that the processors of the disk controller 20' are divided into four clusters (cluster A 210, cluster B 220, cluster C 270 and cluster D 280).

Where three or more clusters are included as in the present embodiment, a plurality of combinations of clusters which can distributedly process a job may be defined. In the present embodiment, in order to permit each processor to recognize the combination of clusters, distributedly processable cluster combination information is provided in the control memory 232 in the shared memory 230.

FIGS. 10 and 11 show formats of the distributedly processable cluster combination information. The distributedly processable cluster combination information 100 includes information indicating whether one job can be distributedly processed or not among clusters, in a field at a crosspoint of cluster numbers indicated on an ordinate and cluster numbers indicated on an abscissa. For example, the distributedly processable cluster combination information shown in FIG. 10 includes information OK indicating the distributed process is accepted in all fields. It indicates that the processors of all clusters have the data transfer control programs of the same version in their local memories and a job my be distributedly processed among any processor of any of the clusters. The distributedly processable cluster combination information shown in FIG. 11 includes information NG indicating that the distributed process is not permitted in only the fields of combinations of the cluster A and other clusters. Such setting of the distributedly processable cluster combination information is made when only the processors belonging to the cluster A execute the data transfer program which is different from those of the processors of other clusters.

In the present embodiment, in the data transfer control process, when the executable processor designation bit map 821 of the I/O job control information 800 is to be set, each processor sets the executable processor designation bit map 821 in accordance with the following criterion. Namely, it references the execution cluster indication information 600, and when the execution cluster indication information area 610 is set to '2', it references the distributedly processable cluster combination information 100 and sets '1' in the executability indication field corresponding to the processors belonging to other cluster corresponding to the field having OK set therein. When '1' is set in the execution cluster indication information area 610, the bit '1' is set in the executability indication fields corresponding to all of the processors.

In accordance with the present embodiment, the maintenance process such as the version-up of data transfer program may be conducted in finer unit. In the present embodiment, when the number of clusters is further increased, the cluster group for which the version upgrading of the program has been completed is defined as a first set and cluster group for which the version-up of the program has not been completed is defined as a second set, and the maintenance process may be conducted while conducting a closed job within each set.

Figure 12:
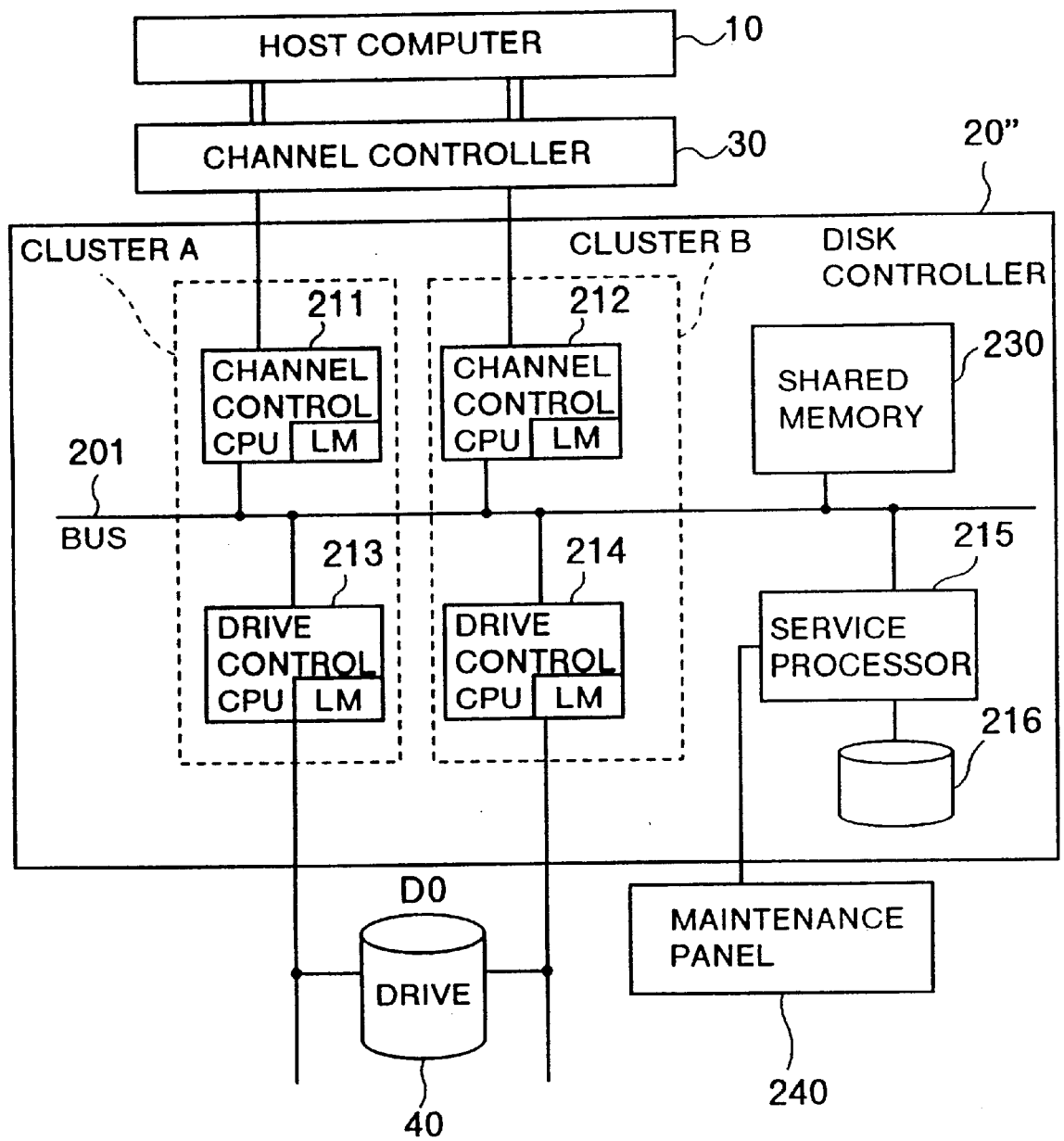
FIG. 12 shows a configuration of the disk controller in accordance with a further embodiment of the present invention.

In the above embodiments, the elements of the disk controller are directly connected to each other although they may be connected through a bus. FIG. 12 shows a configuration of the disk controller when the elements are connected by a bus. In FIG. 12, the processors 211, 212, 213 and 214, the service processor 215 and the shared memory 230 are connected through a bus 201. In the disk controller of this configuration, the maintenance process may be conducted for each cluster in the same manner as that described above so that the modification such as version of the control programs executed by the respective processors may be conducted without wholly stopping the data transfer.

In accordance with the present invention, the programs of different versions are executed by the processors of different clusters to avoid the interference of the programs of different versions. Thus, the system maintenance such as the version upgrading of the program may be conducted without wholly stopping the operation of the multi-processor system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of performing maintenance on a disk controller which is coupled between a host computer and a disk drive and has a plurality of channel control processors and a plurality of drive control processors, said method comprising the steps of:
    (a) selecting one of a plurality of clusters, each of which includes at least one of said plurality of channel control processors and at least one said plurality of drive control processors; and
    (b) loading a new version of a program into a memory of each of said channel control processors and one each of said drive control processors contained in said selected one of said plurality of clusters from an external device of said disk controller while a non-selected one of said plurality of clusters, not having loaded said new version of said program in memory of each of said channel and drive control processors contained in said non-selected one of said plurality of clusters, continues processing an instruction from said host computer.

2. A method of performing maintenance on a disk controller according to claim 1, further comprising the step of:
    (c) repeating said steps (a) and (b) until said new version of said program is loaded in each of said clusters.

3. A method of performing maintenance on a disk controller according to claim 2, further comprising the step of:
    (d) executing, after completion of said step (c), said new version of said program in said plurality of channel control processors and said plurality of drive control processors.

4. A method of performing maintenance on a disk controller according to claim 2, further comprising the step of:
    (e) stopping, after completion of said step (a), processing of an instruction from said host computer in said selected one of said plurality of clusters.

5. A method of performing maintenance on a disk controller according to claim 4, further comprising the step of:
    (f) changing, before execution of said step (a), a mode of said disk controller into a cluster mode.

6. A method of performing maintenance on a disk controller according to claim 2, further comprising the step of:
    (d) executing, after completion of said step (c), said new version of said program in said plurality of channel control processors and said plurality of drive control processors.

7. A method of performing maintenance on a disk controller according to claim 1, wherein said step (a) selects one of a plurality of clusters based on a table which includes cluster allocation information which indicates a relation among said plurality of clusters, said plurality of channel control processors, and said plurality of drive control processors.

8. A method of performing maintenance on a disk controller according to claim 7, wherein said table includes a processor number area, allocated cluster number area, and a processor attribute area.

9. A method of performing maintenance on a disk controller which is coupled between a host computer and a disk drive and has a plurality of channel control processors and a plurality of drive control processors, said method comprising the steps of:

(d) selecting plural ones of a plurality of clusters, each of which includes at least one of said plurality of channel control processors and at least one of said plurality of drive control processors; and (b) loading a new version of a program into a memory of each of said channel control processors and said drive control processors contained in each of said selected plural ones of said plurality of clusters from an external device of said disk controller while a non-selected one of said plurality of clusters, not having loaded said new version of said program in memory of each of said channel and drive control processors contained in said non-selected one of said plurality of clusters, continues processing an instruction from said host computer.

10. A method of performing maintenance on a disk controller according to claim 9, further comprising the step of:

(c) repeating said steps (a) and (b) until said new version of said program is loaded in each of said clusters.

\* \* \* \* \*